United States Patent [19]

Weishaupt

[11] 3,961,366

[45] June 1, 1976

[54] APPARATUS FOR EXPOSING A LIGHT-SENSITIVE LAYER

[75] Inventor: Paul Weishaupt, Oberburg, Switzerland

[73] Assignee: Wagner & Cie AG, Burgdorf, Switzerland

[22] Filed: June 10, 1974

[21] Appl. No.: 478,355

Related U.S. Application Data

[62] Division of Ser. No. 355,919, April 30, 1973, Pat. No. 3,897,250.

[30] Foreign Application Priority Data

May 15, 1972 Switzerland.......................... 7183/72

[52] U.S. Cl. .............................. 358/80; 178/6.7 R
[51] Int. Cl.² ........................................... H04N 5/84
[58] Field of Search ................ 358/6, 7, 9, 60, 80; 355/20, 40, 43; 178/6.7 R; 353/31

[56] References Cited
UNITED STATES PATENTS

| | | | |
|---|---|---|---|
| 3,165,024 | 1/1965 | McClure ........................... | 355/40 X |
| 3,537,788 | 11/1970 | Young ................................. | 355/40 |
| 3,673,932 | 7/1972 | Rottmiller ......................... | 355/43 X |
| 3,673,933 | 7/1972 | Hamann ............................. | 355/43 X |
| 3,784,736 | 1/1974 | Novak ................................. | 358/32 |

*Primary Examiner*—Benedict V. Safourek
*Assistant Examiner*—Mitchell Saffian
*Attorney, Agent, or Firm*—Werner W. Kleeman

[57] ABSTRACT

An apparatus for exposing a light-sensitive layer employed for the manufacture of reproductions of black-and-white or colored patterns, wherein the image of the pattern which has been projected onto a support is taken or scanned by means of an electronic camera and stored on a recording carrier. The light-sensitive layer initially is purely optically exposed with the image of the pattern. The light-sensitive layer is also additionally exposed with the stored image for correction of contrast and/or color shade.

3 Claims, 3 Drawing Figures

3,961,366

APPARATUS FOR EXPOSING A LIGHT-SENSITIVE LAYER

CROSS-REFERENCE TO RELATED CASE

This is a divisional application of my commonly assigned copending United States application, Ser. No. 355,919, filed Apr. 30, 1973, now U.S. Pat. No. 3,897,250.

BACKGROUND OF THE INVENTION

The present invention relates to an improved method of exposing a light-sensitive layer employed for the production of reproductions of black-and-white or color patterns, in that the image of the pattern projected upon a support is taken or scanned by means of an electronic camera and stored on a recording carrier, and the light-sensitive layer is initially purely optically exposed with the image of the pattern. The invention also relates to an improved apparatus for the performance of the method which is of the type incorporating a support table for the light-sensitive layer and a purely optical projection device for the projection of the pattern at the support table, a first device with an electronic camera for producing video signals from the pattern projected at the support table and a video recording device for recording the video signals on a recording carrier.

During reproduction techniques for the fabrication of printing forms, a light-sensitive layer, preferably applied to a film is exposed as is known with the image of the pattern in order to thus produce a printing form. During the exposure or illumination of the light-sensitive layer, it is possible in particular to overcome general errors for color reproductions, which for instance could arise through the color selection for printing, or also contrast errors through the use of so-called masking techniques. The known masking techniques operate in a subtractive manner in that — starting from colored patterns, whether such be photographic slides or direct visual patterns — there is initially fabricated a color film negative through the use of certain color filters and then after developing the same such is placed upon the pattern. By virtue of these measures there automatically is increased the opaqueness of the patterns by a factor of 10 to 20. To compensate such effect there is required a greater quantity of light for this reproduction technique. During the projection of such patterns which are coated with a number of color film negatives, so-called sandwich patterns, at the light-sensitive layer by means of optical devices there occur difffusion disturbance effects leading to impairment of contrast, wherein for instance there must be taken into account flattening of the photographic sound recording values in contrast to the patterns.

Furthermore, such type correction masks are indifferent, in other words, when it is desired to change the mode of operation of the mask during the reproduction technique, then it is necessary to produce new color film negatives, requiring an additional expenditure in work, so that the fabrication procedures are considerably delayed.

If printing forms of colored patterns are to be fabricated for roller offset printing, then it is furthermore necessary to produce additional correction masks for secondary color separation.

SUMMARY OF THE INVENTION

Hence, it is a primary object of the present invention to provide an improved apparatus for activation of the light-sensitive layer in a considerably simplified manner for the reproduction-technological fabrication of printing forms, and wherein the above-mentioned drawbacks do not occur.

The method of the invention is manifested by the features that for the correction of the contrast and/or the color or hue the light-sensitive layer is additionally exposed with the stored image.

The inventive apparatus is manifested by the features that there is provided a second device for the additional projection of the image of the pattern stored on the recording carrier at the light-sensitive layer.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
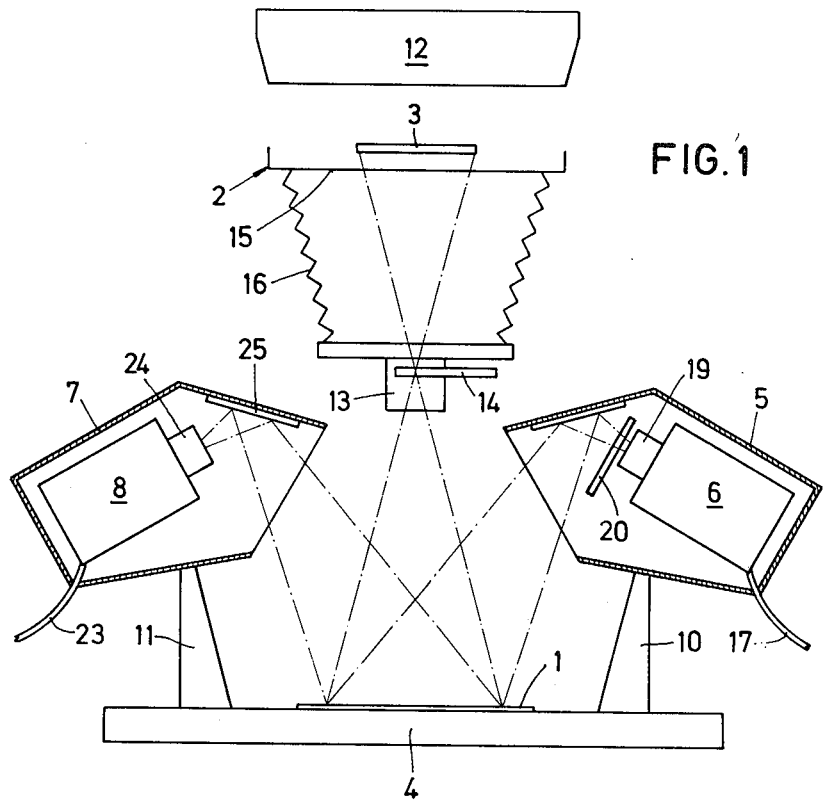
FIG. 1 schematically illustrates part of the apparatus for the performance of the inventive method.
Figure 2:
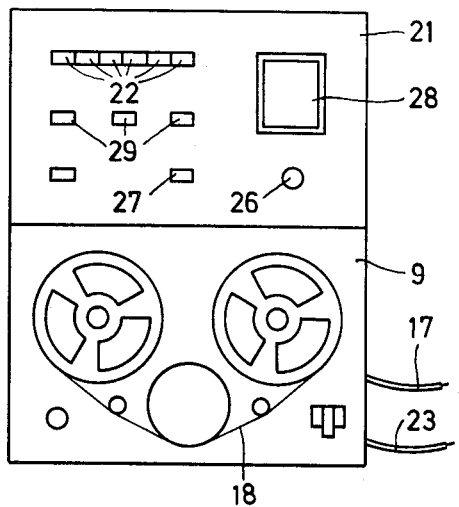
FIG. 2 illustrates a video recording device with a control mechanism.

Describing now the drawings, the apparatus which has only been schematically depicted in FIG. 1, for the exposure of a light-sensitive layer 1, encompasses a purely optical device 2 for the projection of a photographic slide pattern 3 or the like upon the light-sensitive layer 1 which is situated upon support table 4. The apparatus further comprises a first mechanism 5 having an electronic camera 6, a second mechanism 7 with a playback or reproduction device 8, and a video recording device 9 illustrated in detail in FIG. 2. The first and second mechanisms or devices 5 and 7 are retained by means of supports 10 and 11 respectively over the support table 4. Behind the photographic slide pattern 3 there is provided a light source 12 which delivers the quantity of light needed for the exposure of the light-sensitive layer 1.

The projection device 2 possesses an objective 13 equipped with a filter mechanism 14. This objective 13 is connected with a holding device 15 for the slide pattern 3 via an extendable bellows or diaphragm 16, so that it is possible to attain an exact sharp focussing adjustment of the projected image of the photographic slide pattern 3.

The exposure of the light-sensitive layer 1 is carried out in the following way. Initially, instead of the light sensitive layer 1, there is placed upon the support table 4 a non-illustrated white substrate or support and the photographic slide pattern 3 is projected onto this support. The image which has been projected onto the support is then taken or scanned by the electronic camera 6 which is housed at the device 5 and transformed into electrical signals. These signals arrive via a cable 17 at the video recording device 9 and are stored on a recording carrier 18.

A filter mechanism 20 is arranged in front of the objective 19 of the camera 6. This filter mechanism 20 encompasses at least color filters for the primary or base colors, so that at least three corresponding recordings of the image of the slide pattern 3 can be stored at the recording carrier 18 which is preferably a video tape. In this way, it is possible to successively store different modulated image sequences wherein the filter device 14 of the projection apparatus 2 and the filter device 20 of the camera 6 can be remotely controlled through actuation of keys 22 by non-depicted drives from a control mechanism 21 associated with the recording device 9.

Preferably for each printing ink cyanogen, magenta, yellow and black, there is stored a respective reproduction of the image of the pattern 3 on the recording carrier 18. Subsequently, the above-mentioned white support or substrate is removed from the support table 4 and the light-sensitive layer 1 is placed upon such support table. Thereafter, this layer 1 is exposed by means of the purely optical device 2 and at the same time or thereafter there occurs an additional exposure of the light-sensitive layer 1 by the second device 7 which contains the reproduction device 8 for the image sequence stored on the recording carrier 18. In the reproduction device 8 there is provided a non-visible television projection tube which has delivered thereto the video signals via a cable 23 from the video recording device 9. The color-corrected image of the pattern 3 appearing at the screen of the television projection tube is projected by means of an objective 24 of the reproduction device 8, and a mirror 25 at the light-sensitive layer 1. The contrast of the additional image of the pattern 3 projected at the light-sensitive layer 1 can be changed with an adjustment knob 26 of the control mechanism 21 and accommodated to the required value. Furthermore, the control mechanism 21 possesses a reversing switch means 27 by means of which the video signals can be switched-over, so that selectively there can be carried out a positive or a negative projection of the stored image of pattern 3. Moreover, the control mechanism 21 also possesses a monitor 28 for controlling the image to be projected.

At the control mechanism 21 there are preferably stored a number of programs, for instance 3 programs, and according to which programs the above-discussed method steps can be automatically carried out. These individual programs can be selected by selector buttons or keys 29, so that after actuation of one of such selector keys 29 it is possible to automatically carry out a certain exposure operation.

Figure 3:
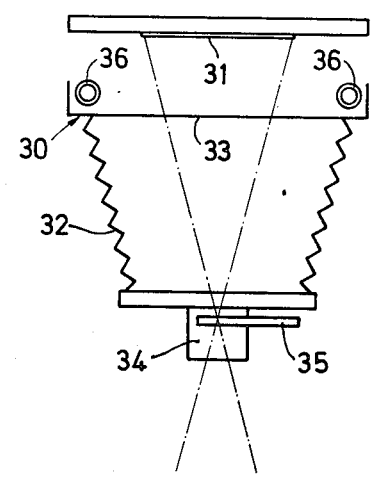
FIG. 3 schematically illustrates an optical device for the projection of a non-transparent pattern.

In FIG. 3, there is illustrated in very simplified form, a different purely optical device or mechanism 30, which may be used for the purely optical device 2, for the projection of a non-transparent pattern 31 at a light-sensitive layer, such as the light sensitive layer 1 of FIG. 1. This mechanism 30 likewise contains an objective 34 provided with a holding device 33 connected via a bellows 32, and which objective 34 has associated therewith a filter mechanism 35. In the holding device 33 there are arranged light sources 36 for the illumination of the pattern 31.

During the use of the above-mentioned technique, the greatest proportion of the image information of the pattern is directly transmitted in purely optical manner to the light-sensitive layer 1 and only a small portion, about 5% to 15% of the image information, arrives via the additional exposure providing a color-correcting and/or contrast correcting effect, at the light-sensitive layer 1. In this way, practically the entire image information is transmitted to the light-sensitive layer 1.

The limited resolution capacity of the electronic camera 6 and the reproduction device 8 is more than compensated by the complete elimination of the diffusion disturbance effects, which occur when using the known sandwich patterns, and the shape of the contrast curve is decisively improved. Hence, there results for all of the shade value regions of the reproduction improved reproduction effects.

The above-described method possesses in contrast to the known purely optical techniques the following advantages:

1. There is no need for development process i.e. correction masks are no longer required and therefore the time-consuming development process is eliminated;

2. The electronic image can be randomly modulated and can be positively or negatively employed at the main exposure; and 3. The image storage material can be reused a number of times.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. An apparatus for exposing a light-sensitive layer serving to make reproductions of black-and-white or color patterns comprising in combination:
   a support table for the light sensitive layer;
   a purely optical projection means for projecting a first image of a pattern onto the light-sensitive layer when positioned on the support table;
   an electronic camera means for scanning the projected pattern image and for generating video signals of the image of the pattern projected onto the light-sensitive layer;
   a video recording means operatively connected with the electronic camera means for storing the video signals on a recording carrier;
   control means operatively connected with said video recording means for selecting a stored video signal corresponding to a second image to be projected onto the light-sensitive layer; and
   an electro-optical projection means receiving said selected stored video signal from said video recording means for projecting said second image of the pattern onto the light-sensitive layer to be exposed, to thereby correct the contrast of color shades or both of the first projected pattern image;
   said purely optical projection means and said electro-optical projection means being positionally disposed such that said first and second images of the pattern projected onto the light-sensitive layer by said purely optical projection means and said electro-optical projection means substantially coincide.

2. The apparatus as defined in claim 1, wherein the electronic camera means comprises color filter means at least for the primary colors for the storage of a number of recordings which can be used for the correction of the colors of the projected pattern image.

3. The apparatus as defined in claim 1, wherein the purely optical projection means is constructed for the projection of photographic slide patterns and/or non-transparent patterns.

* * * * *